(12) United States Patent
Thomsen

(10) Patent No.: US 11,343,245 B2
(45) Date of Patent: May 24, 2022

(54) SYSTEMS AND METHODS FOR SECURITY OF NETWORK CONNECTED DEVICES

(71) Applicant: Harman International Industries, Incorporated, Stamford, CT (US)

(72) Inventor: Brant D. Thomsen, South Jordan, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 251 days.

(21) Appl. No.: 16/622,899

(22) PCT Filed: Jun. 14, 2017

(86) PCT No.: PCT/IB2017/053542
§ 371 (c)(1),
(2) Date: Dec. 13, 2019

(87) PCT Pub. No.: WO2018/229531
PCT Pub. Date: Dec. 20, 2018

(65) Prior Publication Data
US 2020/0213306 A1    Jul. 2, 2020

(51) Int. Cl.
*H04L 29/06* (2006.01)
*G06F 16/182* (2019.01)
(Continued)

(52) U.S. Cl.
CPC ...... *H04L 63/0876* (2013.01); *G06F 16/1837* (2019.01); *H04L 9/0637* (2013.01);
(Continued)

(58) Field of Classification Search
None
See application file for complete search history.

(56) References Cited

U.S. PATENT DOCUMENTS

| 2007/0250700 A1 | 10/2007 | Sidhu et al. |
| 2015/0052615 A1 | 2/2015 | Gault et al. |
| 2017/0111175 A1* | 4/2017 | Oberhauser ............ G06Q 10/06 |

FOREIGN PATENT DOCUMENTS

| GB | 2444342 A | 6/2008 |
| WO | 2017004527 A1 | 1/2017 |

OTHER PUBLICATIONS

ISA European Patent Office, International Search Report and Written Opinion Issued in Application No. PCT/IB2017/053542, dated Mar. 5, 2018, WIPO, 14 pages.

(Continued)

*Primary Examiner* — William J. Goodchild
(74) *Attorney, Agent, or Firm* — McCoy Russell LLP

(57) ABSTRACT

There is provided a method of validating a first computing device based on copies of a distributed database storing a trust parameter indicative of a trusted or untrusted designation for network connected second computing devices, the method performed by a certain second computing device designated as trusted, comprising: receiving a validation request for designation as trusted transmitted by the first computing device designated as untrusted, querying trust-resource(s) to determine whether the first computing device should be designated as trusted or untrusted, when a trust parameter is obtained from the trust-resource, creating a new record storing the trust parameter of the first computing device, a first unique identifier indicative of the first computing device, and a second unique identifier indicative of the certain second computing device, and distributing the new record over the network for local verification and updating of respective copies of the distributed database.

20 Claims, 6 Drawing Sheets

(51) Int. Cl.
*H04L 9/06* (2006.01)
*H04L 9/08* (2006.01)
*H04L 9/32* (2006.01)
(52) U.S. Cl.
CPC .......... *H04L 9/0825* (2013.01); *H04L 9/0891* (2013.01); *H04L 9/3242* (2013.01)

(56) References Cited

OTHER PUBLICATIONS

ISA European Patent Office, Written Opinion of the International Preliminary Examining Authority Issued in Application No. PCT/IB2017/053542, dated May 10, 2019, WIPO, 7 pages.
Bashir, I., "Mastering Blockchain: Distributing ledgers, decentralization and smart contracts explained," Birmingham, United Kingdom, Packet Publishing Ltd., Mar. 2017, 534 pages. (Submitted in Two Parts).
International Bureau of WIPO, International Preliminary Report on Patentability Issued in Application No. PCT/IB2017/053542, dated Aug. 26, 2019, WIPO, 15 pages.
State Intellectual Property Office of the People's Republic of China, Office Action and Search Report Issued in Application No. 201780092155.4, dated Dec. 27, 2021, 12 pages. (Submitted with Partial Translation).

* cited by examiner

SYSTEMS AND METHODS FOR SECURITY OF NETWORK CONNECTED DEVICES

CROSS-REFERENCE TO RELATED APPLICATIONS

The present application is a U.S. National Phase of International Patent Application Serial No. PCT/IB2017/053542 entitled "SYSTEMS AND METHODS FOR SECURITY OF NETWORK CONNECTED DEVICES," filed on Jun. 14, 2017. The entire contents of the above-referenced application is hereby incorporated by reference for all purposes.

TECHNICAL FIELD

The present invention, in some embodiments thereof, relates to network connected devices and, more specifically, but not exclusively, to systems and methods for security of network connected devices.

BACKGROUND

The term Internet of Things (IoT) describes an environment where large numbers of physical computing devices are internetworked, and become more useful due to their ability to share and use information provided by other computing devices. While many of these devices may be limited or simple, such as sensors and switches, they may be combined to perform complicated operations and provide new capabilities none of the devices can support on their own.

However, the sheer numbers of computing devices that may participate in an Internet of Things instance (e.g., smart home, store, automobile, office, and the like) makes it difficult keep the computing devices secure. For example, when a malicious entity breaks into any of the computing devices and runs malicious code on that entity, the attacker has potential access to other Internet of Things devices and their confidential data, or may even cause an Internet of Things instance to behave in undesirable ways. The described security concern is one of the primary factors limiting the growth and acceptance of the Internet of Things by consumers.

Moreover, as the Internet of Things expands to encompass the massive number of devices necessary to build smart grids or smart cities, the number of vulnerabilities and attack vectors will increase dramatically, making them even more challenging to deploy securely.

SUMMARY

According to a first aspect, a method of validating a first computing device based on a plurality of copies of a distributed database each storing a trust parameter indicative of a trusted or untrusted designation for each of a plurality of network connected second computing devices, the method performed by a certain second computing device designated as trusted, comprises: receiving a validation request for designation as trusted transmitted by the first computing device designated as untrusted, querying at least one trust-resource to determine whether the first computing device should be designated as trusted or untrusted, when a trust parameter is obtained from the trust-resource, creating a new record storing the trust parameter of the first computing device, a first unique identifier indicative of the first computing device, and a second unique identifier indicative of the certain second computing device, and distributing the new record over the network for local verification and updating of respective copies of the plurality of copies of the distributed database each locally stored in association with a respective second computing device, wherein the distributed database is arranged according to an order of creation of new records.

According to a second aspect, a system for validating a first computing device based on a plurality of copies of a distributed database each storing a trust parameter indicative of a trusted or untrusted designation for each of a plurality of network connected second computing devices, comprises: a certain second computing device designated as trusted, comprises: a non-transitory memory having stored thereon a code for execution by at least one hardware processor of the certain second computing device, the code comprising: code for receiving a validation request for designation as trusted transmitted by the first computing device designated as untrusted, code for querying at least one trust-resource to determine whether the first computing device is designated as trusted, code for detecting when a trusted designation is obtained from the trust-resource, and creating a new record storing the trust designation of the first computing device, a first unique identifier indicative of the first computing device, and a second unique identifier indicative of the certain second computing device, and code for distributing the new record over the network for local verification and updating of respective copies of the plurality of copies of the distributed database each locally stored in association with a respective second computing device, wherein the distributed database is arranged according to an order of creation of new records.

According to a third aspect, a computer program product for validating a first computing device based on a plurality of copies of a distributed database each storing a trust parameter indicative of a trusted or untrusted designation for each of a plurality of network connected second computing devices, comprises: a non-transitory memory having stored thereon a code for execution by at least one hardware processor of a certain second computing device, the code comprising: instructions for receiving a validation request for designation as trusted transmitted by the first computing device designated as untrusted, instructions for querying at least one trust-resource to determine whether the first computing device is designated as trusted, instructions for detecting when a trusted designation is obtained from the trust-resource, and creating a new record storing the trust designation of the first computing device, a first unique identifier indicative of the first computing device, and a second unique identifier indicative of the certain second computing device, and instructions for distributing the new record over the network for local verification and updating of respective copies of the plurality of copies of the distributed database each locally stored in association with a respective second computing device, instructions the distributed database is arranged according to an order of creation of new records.

According to a fourth aspect, a method of validating whether a first computing device is designated as trusted based on a plurality of copies of a distributed database each storing a trusted or untrusted designation for each of a plurality of network connected computing devices, the method performed by a second computing device designated as trusted, comprises: querying at least one copy of the plurality of copies of the distributed database to identify a latest record storing a first unique identifier indicative of the first computing device, when the identified latest record storing the first unique identifier includes a designation of trusted, accessing another unique identifier of the identified latest record indicative of a third computing device that validated the first computing device, and designating the first computing device as untrusted when at least one of: the third computing device is designated as untrusted, and the third computing device is not authenticated.

According to a fifth aspect method of invalidating a first computing device designated as trusted based on a plurality of copies of a distributed database each storing a trust parameter indicative of a trusted or untrusted designation for each of a plurality of network connected computing devices, the method performed by a second computing device designated as trusted, the method comprises: determining that the computing device designated as trusted should be untrusted, creating a first new record storing the untrusted designation of the first computing device, a first unique identifier indicative of the first computing device, and a second unique identifier indicative of the second computing device, traversing at least one copy of the distributed database to identify at least one third computing device that designated the first computing device as trusted, creating at least one second new record storing an untrusted designation for each respective third computing device, a third unique identifier indicative of the respective third computing device, and the second unique identifier, and distributing the first new record and the at least one second new record over the network for local verification and updating of respective copies of the plurality of copies of the distributed database.

According to a sixth aspect, a method of responding to being designated as untrusted based on a plurality of copies of a distributed database each storing a trust parameter indicative of a trusted or untrusted designation for each of a plurality of network connected computing devices, the method performed by a first computing device designated as trusted, comprises: receiving a first new record over the network storing an untrusted designation of the first computing device, and a second unique identifier of the second computing device that created the first new record, creating a second new record storing an untrusted designation of the second computing device, the second unique identifier, and a first unique identifier of the first computing device, and distributing the second new record over the network for local verification and updating of respective copies of the plurality of copies of the distributed database.

According to a seventh aspect, a system for validating network connected computing devices, comprises: a non-transitory memory having stored thereon a copy of a plurality of copies of a distributed database, the copy for access by at least one hardware processor of at least one of the network connected computing devices, the copy comprising a plurality of records, each record of the plurality of records storing data associated with a certain computing device, each record comprising: a trust parameter indicative of a trusted or untrusted designation of the certain computing device of the plurality of network connected computing devices, a first unique identifier indicative of the certain computing device, and a second unique identifier indicative of a second computing device that performed the trusted or untrusted designation of the certain computing device, wherein the copy of the distributed database is arranged according to an order of creation of each of the plurality of records.

The systems and/or methods and/or code instructions described herein provide a technical solution to the technical problem of determining whether a computing device attempting to join a network session (e.g., IoT instance) is trusted. The technical solution described herein further addresses the technical problem of revoking the trust designation of the computing device when the computing device is suspected or known to be untrusted.

The systems and/or methods and/or code instructions described herein improve performance of the network session (e.g., IoT instance), computing devices participating in the network sessions, and/or performance of the network transmitting data associated with the network session. The improvement in performance is obtained, for example, by improved network security. Improved security is provided, for example, by maintenance of copies of the distributed database using calculated values (e.g., using a hash function) based on one or more earlier records and/or blocks in the sequence. Changing any record within the distributed database by a malicious entity is difficult if not impossible, since such changes are quickly detected when verification of a new record for addition to the sequence fails. Malicious tampering with the distributed database is reduced or prevented.

A new computing device, which is initially assumed to be untrusted, is prevented from joining itself to the network session. The new computing device may be joined to the network session by another computing device upon obtaining a trusted designation by the computing device associated with a trusted designation. Copies of the distributed database, optionally implemented based on blockchain architecture, store the trusted or untrusted designation of computing devices. Other computing devices access a certain copy of the distributed database to determine whether the new computing device is trusted or untrusted. Computing devices designated as trusted may assign the trusted designation to the new computing device.

The distributed database, optionally based on the blockchain architecture, is not necessarily managed by a central authority. Computing devices may each create a record for distributed and local update of respective copies of the distributed database. In a network session that operates without necessarily requiring a central authority, for example, an IoT instance, computing devices which may be compromised may attempt to join and/or may leave at any time. The distributed database which is based on multiple copies located at different storage sites, reduces the risk of corruption and/or being overridden by one or more malicious computing devices. The trust state (e.g., trusted or untrusted designation) stored in the distributed database may be considered secure and reliable.

The distributed database records the order in which trusted or untrusted designations occur. The order of the records indicates whether the trusted designation or the untrusted designation occurred first or occurred last. Computing devices accessing the distributed database assume that the information stored in the more recent record is correct. Potential conflicts may occur, for example, when two or more different computing devices are validating computing device 202B at a similar time interval. For example, when both computing devices receive the validation requests transmitted by computing device 202B. One computing device determines that computing device 202B is trusted, while the other computing device determines that computing device 202B is untrusted. Both computing devices create records with their respective determined designations, and transmit the records over the network for updating of copies of the distributed database. When the record storing the trusted designation is added first and the record storing the untrusted designation is added second, the distributed database represents a secure situation, in which computing device 202B is designated as untrusted, requiring a re-validation for designation as trusted. However, when the record storing the untrusted designation is added first followed by the record storing the trusted designation, a vulnerable security situation arises in which a compromised and/or malicious computing device may appear to other computing devices as trusted. The computing device that designated computing device 202B as untrusted monitors records and/or the distributed database to make sure that the untrusted designation record takes priority over other records created within a time requirement that designate the computing device as trusted.

In a further implementation form of the first, second, third, fourth, fifth, sixth, or seventh aspects, the trust parameter is selected from the group consisting of: (i) a trust score storing a value, wherein another computing device accessing the record of the certain computing device executes code instructions for designating the certain computing device as trusted or untrusted according to the value of the trust score, and (ii) a designation of trusted or untrusted.

In a further implementation form of the first, second, third, fourth, fifth, sixth, or seventh aspects, the distributed database is arranged based on a block-chain architecture, wherein each record is stored in a block of the block-chain including a respective block header and a hash-value calculated from one or more previous blocks in the chain, wherein the records are stored in blocks indicative of an order of events associated with the records, wherein each respective block includes a digital signature created with a private key of a third computing device that designated the computing device associated with the respective block, wherein a fourth computing device verifies that the third computing device designated the computing device associated with the respective block with a public key of the third computing device corresponding to the private key.

In a further implementation form of the first, second, third, fourth, fifth, sixth, or seventh aspects, the respective header stores a nonce.

In a further implementation form of the first, second, third, fourth, fifth, sixth, or seventh aspects, further comprising: receiving a second new record for insertion in a certain copy of the distributed database managed by the certain second computing device, verifying creation of the second new record by another second computing device designated as trusted, and updating the certain copy of the distributed database with the second new record.

In a further implementation form of the first, second, third, fourth, fifth, sixth, or seventh aspects, further comprising: monitoring a certain copy of the distributed database managed by the certain second computing device, to detect orphaning of at least one record, and adding the trust parameter and unique identifiers of the orphaned record to a second new record in the longest validated chain of records of the certain copy of the distributed database.

In a further implementation form of the first, second, third, fourth, fifth, sixth, or seventh aspects, further comprising: designating the first computing device as untrusted when the certain second computing device is unable to validate the first computing device, and transmitting the validation request to another second computing device for attempted validation of the first computing device by the another second computing device.

In a further implementation form of the first, second, third, fourth, fifth, sixth, or seventh aspects, further comprising: when no second computing devices designated as trusted are detected by the certain second computing device, creating a new distributed database storing a record that includes the second unique identifier indicative of the certain second computing device and a trust designation of the second computing device, wherein the new record storing the trusted designation of the first computing device is added to the new distributed database.

In a further implementation form of the first, second, third, fourth, fifth, sixth, or seventh aspects, further comprising: determining whether a third computing device is designated as trusted by performing: querying at least one copy of the plurality of copies of the distributed database to identify the latest record storing a third unique identifier indicative of the third computing device, when the identified latest record storing the third unique identifier includes a designation of trusted, accessing another unique identifier of the identified latest record indicative of a fourth computing device that validated the third computing device, and designating the third computing device as untrusted when at least one of: the fourth computing device is designated as untrusted, and the fourth computing device is not authenticated.

In a further implementation form of the first, second, third, fourth, fifth, sixth, or seventh aspects, further comprising: traversing records of the distributed database to iteratively identify each computing device that designated the computing device of the current record as trusted.

In a further implementation form of the first, second, third, fourth, fifth, sixth, or seventh aspects, further comprising: verifying that the third computing device owns a public key stored by the identified latest record and that the third computing device knows a private key corresponding to the public key.

In a further implementation form of the first, second, third, fourth, fifth, sixth, or seventh aspects, the private key corresponding to the public key is automatically corrupted when the third computing device is compromised such that the third computing device is designated as untrusted in response to the corrupted private key that does not correspond to the public key. Damaging the private key in response to compromise of the computing device triggers other computing devices to designate the compromised computing device as untrusted, reducing or preventing damage caused by the compromised computing device.

In a further implementation form of the first, second, third, fourth, fifth, sixth, or seventh aspects, further comprising: designating the first computing device as untrusted when a timeout associated with the trust designation of the first computing device is met, creating an updated record storing the untrusted designation of the first computing device, the first unique identifier, and the second unique identifier, and distributing the updated record over the network for local verification and updating of respective copies of the plurality of copies of the distributed database. The periodic re-verification prevents or reduces the risk of a malicious computing device posing as the trusted computing device 202C to computing device 202A for extended periods of time.

In a further implementation form of the first, second, third, fourth, fifth, sixth, or seventh aspects, further comprising: determining that a third computing device designated as trusted should be untrusted, creating a second new record storing the untrusted designation of the third computing device, a third unique identifier indicative of the third computing device, and the second unique identifier, traversing at least one copy of the distributed database to identify at least one fourth computing device that designated the third computing device as trusted, creating at least one third new record each storing an untrusted designation of each respective fourth computing device, a fourth unique identifier indicative of the respective fourth computing device, and the second unique identifier, and distributing the second new record and the at least one third new record over the network for local verification and updating of respective copies of the plurality of copies of the distributed database.

In a further implementation form of the first, second, third, fourth, fifth, sixth, or seventh aspects, further comprising: monitoring for a fourth new record received over the network storing a trusted designation of the third computing device, wherein the fourth new record is created within a time requirement of the creation of the second new record, re-creating the second new record, wherein the re-created second new record stores an order parameter indicating that the plurality of copies of the distributed database are updated by designating the re-created second new record as more recent over the fourth new record, and distributing the re-created second new record over the network for local verification and updating of respective copies of the plurality of copies of the distributed database.

In a further implementation form of the first, second, third, fourth, fifth, sixth, or seventh aspects, further comprising: receiving a second record over the network storing an untrusted designation of the certain second computing device, and a third unique identifier of a third computing device that created the second record, creating a third record storing an untrusted designation of the third computing device, the third unique identifier, and the second unique identifier, and distributing the third record over the network for local verification and updating of respective copies of the plurality of copies of the distributed database.

By responding to the designation of the computing device as untrusted and creating a new record designating another computing device as untrusted, the risk of a malicious device being able to remove existing trusted computing devices from the network session (e.g., IoT instance) while retaining access to the network session is prevented or reduced.

In a further implementation form of the first, second, third, fourth, fifth, sixth, or seventh aspects, further comprising: transmitting over the network, a second validation request for designation of the certain second computing device as trusted.

In a further implementation form of the first, second, third, fourth, fifth, sixth, or seventh aspects, further comprising: detecting a third computing device without the third computing device transmitting the validation request for designation as trusted, querying at least one trust-resource to determine whether the third computing device is designated as trusted, when a trusted designation is obtained from the trust-resource, creating another new record storing the trust designation of the third computing device, a legacy designation of the third computing device indicative of lack of transmission of the validation request by the third computing device, a third unique identifier indicative of the third computing device, and the second unique identifier, and distributing the another new record over the network for local verification and updating of respective copies of the plurality of copies of the distributed database each locally stored in association with a respective second computing device.

Computing devices designated as trusted which execute the code instructions may vouch for the legacy computing device to participate in the network session (e.g., IoT instance). The periodic re-verification prevents or reduces the risk of a malicious computing device posing as the trusted legacy computing device to the computing device for extended periods of time.

In a further implementation form of the first, second, third, fourth, fifth, sixth, or seventh aspects, further comprising: determining whether a third computing device associated with a legacy designation indicative of lack of transmission of a validation request is designated as trusted by performing: querying at least one copy of the plurality of copies of the distributed database to identify the latest record storing a third unique identifier indicative of the third computing device, when the identified latest record storing the third unique identifier includes a designation of trusted, accessing a further unique identifier of the identified latest record indicative of a fourth computing device that validated the third computing device, and designating the third computing device as untrusted when at least one of: the fourth computing device is designated as untrusted, and the fourth computing device is not authenticated.

In a further implementation form of the first, second, third, fourth, fifth, sixth, or seventh aspects, further comprising: determining that a third computing device designated as legacy indicative of lack of transmission of a validation request designated as trusted should be untrusted, creating a second new record storing the untrusted designation of the third computing device, a third unique identifier indicative of the third computing device, and the second unique identifier, traversing at least one copy of the distributed database to identify a fourth computing device that designated the third computing device designated as legacy as trusted, when the fourth computing device is distinct from the certain second computing device, creating a third new record storing an untrusted designation of the fourth computing device, a fourth unique identifier indicative of the respective fourth computing device, and the second unique identifier, and distributing the second new record and the third new record over the network for local verification and updating of respective copies of the plurality of copies of the distributed database.

In a further implementation form of the first, second, third, fourth, fifth, sixth, or seventh aspects, the validation request includes one or more members selected from the group consisting of: unique network identifier of the first computing device, description of the first computing device, unique public key of the first computing device, and information for assisting in validation of the first computing device by the second computing device.

In a further implementation form of the first, second, third, fourth, fifth, sixth, or seventh aspects, the trust-resource is a member selected from the group consisting of: a graphical user interface (GUI) presented on a display including a mechanism for a manual user designation as trusted or untrusted, a password provided by the first computing device indicative of trusted designation, a security server that authenticates the first computing device, the certain second computing device executing a security protocol for authenticating the first computing device, the certain second computing device stores code instructions indicative of the first computing device.

In a further implementation form of the first, second, third, fourth, fifth, sixth, or seventh aspects, further comprising: traversing records of the distributed database to iteratively identify each computing device that designated the computing device of the current record as trusted, and designating the first computing device as untrusted when at least one of the computing devices of the current record is designated as untrusted.

In a further implementation form of the first, second, third, fourth, fifth, sixth, or seventh aspects, further comprising: verifying that the first computing device owns a public key stored by the identified latest record and that the first computing device knows a private key corresponding to the public key.

In a further implementation form of the first, second, third, fourth, fifth, sixth, or seventh aspects, the private key corresponding to the public key is automatically corrupted when the first computing device is compromised such that the first computing device is designated as untrusted in response to the corrupted private key that does not correspond to the public key.

In a further implementation form of the fifth aspect, further comprising: monitoring for a third new record received over the network storing a trusted designation of the first computing device, wherein the third new record is created within a time requirement of creation of the first new record, re-creating the first new record, wherein the re-created first new record stores an order parameter indicating that the plurality of copies of the distributed database are updated by designating the re-created first new record as more recent over the third new record, and distributing the re-created first new record over the network for local verification and updating of respective copies of the plurality of copies of the distributed database.

In a further implementation form of the first, second, third, fourth, fifth, sixth, or seventh aspects, further comprising: transmitting over the network, a validation request for designation of the first computing device as trusted by another computing device designated as trusted, wherein the validation request includes one or more members selected from the group consisting of: unique network identifier of the first computing device, description of the first computing device, unique public key of the first computing device, and information for assisting in validation of the first computing device by the another computing device.

In a further implementation form of the first, second, third, fourth, fifth, sixth, or seventh aspects, wherein each record of the plurality of records further stores one or more fields selected from the group consisting of: description of the certain computing device, unique public key of the certain computing device, unique public key of the second computing device, trust-resource accessed for validation of the certain computing device, reason for untrusted designation, and description of the second computing device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION

Figure 1:
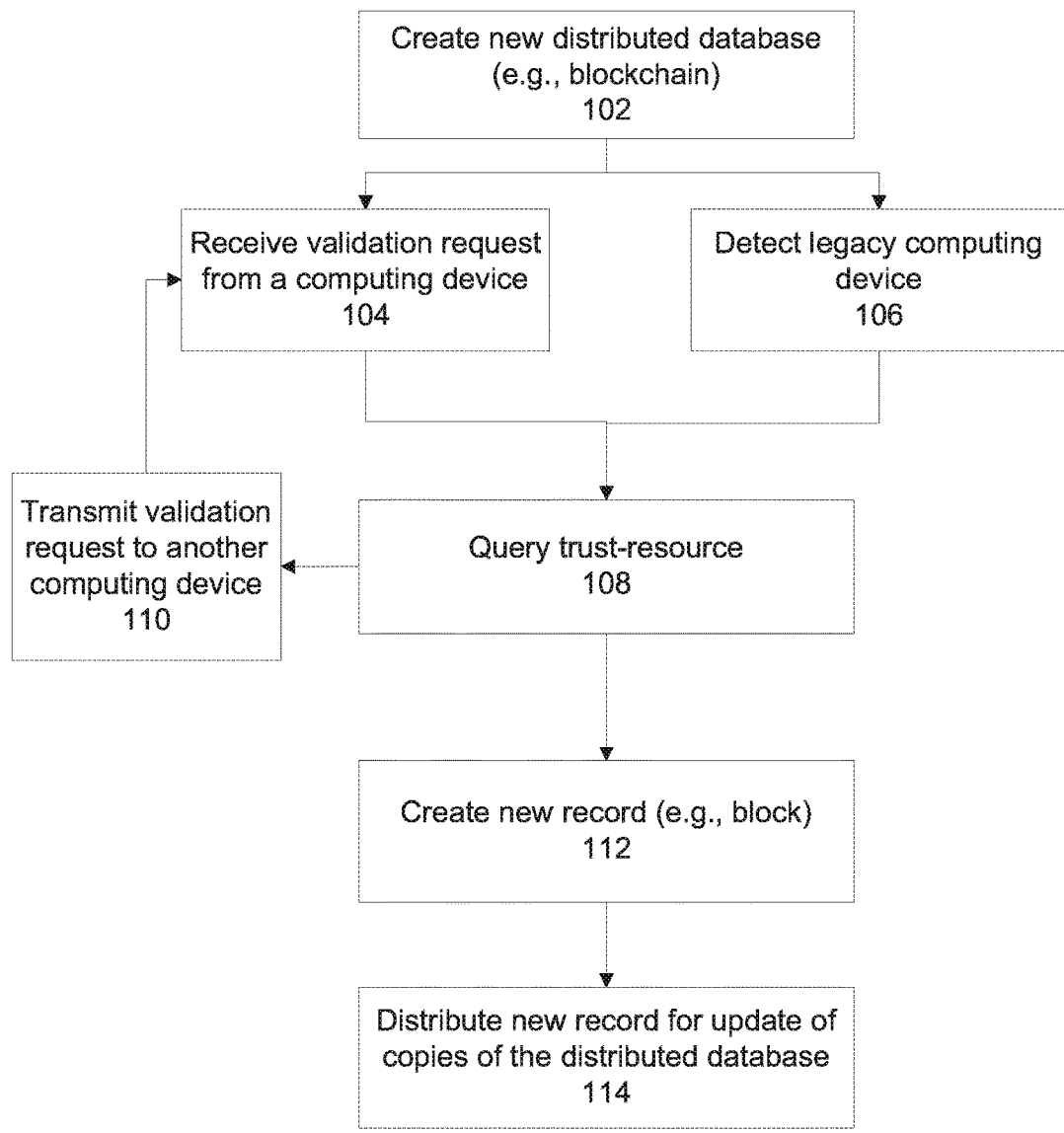
FIG. 1 is a flowchart of a process of managing a distributed database that includes records, with each record storing a trusted or untrusted designation of a respective network connected computing device, in accordance with some embodiments of the present invention.

The present invention, in some embodiments thereof, relates to network connected devices and, more specifically, but not exclusively, to systems and methods for security of network connected devices.

An aspect of some embodiments of the present invention relate to an apparatus, a system, a method, and/or code instructions (stored in a data storage device executable by one or more processors) for managing a distributed database that stores validation states of a network connected computing device, optionally participating in an Internet of Things (IoT) instance. One or more of the computing devices designated as trusted receives a validation request from an untrusted computing device seeking to obtain the trusted designation. The computing device designated as trusted queries one or more trust-resources to determine whether the untrusted computing device is to be designated as trusted. When a trust designation is obtained from the trust-resource(s), a new record is created. The new record stores the trust designation of the computing device that transmitted the validation request, a unique identifier indicative of the computing device that transmitted the validation request, and a unique identifier indicative of the trusted computing device that validated the computing device that transmitted the validation request. The new record is distributed over the network. Computing devices that receive the new record perform local verification of the new record and update their respective copy of the distributed database.

A new computing device, which is initially assumed to be untrusted, is prevented from joining itself to the network session. The new computing device may be joined to the network session by another computing device upon obtaining a trusted designation by the computing device associated with a trusted designation. Copies of the distributed database, optionally implemented based on blockchain architecture, store the trusted or untrusted designation of computing devices. Other computing devices access a certain copy of the distributed database to determine whether the new computing device is trusted or untrusted. Computing devices designated as trusted may assign the trusted designation to the new computing device.

The records are stored according to an order of creation, optionally chained together sequentially, according to time, for example, based on a timestamp of each record, based on a numerical order number, and/or without explicit designation of time (e.g., time of creation is implicit by the chain structure where earlier records are linked to later records). More recent records represent more updated validation states of the computing devices. New records may be added without necessarily deleting and/or modifying old records.

Optionally, the distributed database is arranged based on block-chain architecture. The distributed database, optionally based on the block-chain architecture, is not necessarily managed by a central authority. Computing devices may each create a record for distributed and local update of respective copies of the distributed database. In a network session that operates without necessarily requiring a central authority, for example, an IoT instance, computing devices which may be compromised may attempt to join and/or may leave at any time. The distributed database which is based on multiple copies located at different storage sites reduces the risk of corruption and/or being overridden by one or more malicious computing devices. The trust state (e.g., trusted or untrusted designation) stored in the distributed database may be considered secure and reliable.

Validation of the trust designation state of a certain computing device is based on validating that the computing device that performed the validation is trusted, optionally recursively, optionally until the original computing device (e.g., that initiated the first record of the distributed database) is validated and/or until a requirement is met (e.g., a certain date of creation is reached, a certain number of previous computing devices are validated). A certain copy of the distributed database is accessed to determine whether the certain computing device is designated as trusted or untrusted. The latest record storing an identifier of the certain computing device is identified and the trust state is determined. When the record indicates that the certain computing device is designated as trusted, the trust state of the computing device that validated the certain computing device is determined. The unique identifier of the computing device that validated the certain computing device is obtained from the record of the certain computing device. The latest record storing the unique identifier of the computing device that validated the certain computing device is accessed to obtain the trust state of the computing device that validated the certain computing device. The process may be iterated, by recursively traversing the records of the distributed database, validating the trust designation of each previous computing device, optionally until the original computing device associated with the original record is reached.

When a certain computing device that has a trusted designation is detected as being untrusted (e.g., the certain computing device is running malicious code), a new record storing the untrusted designation is created and distributed for updating of local copies of the distributed database. Optionally, the computing device that designated the certain computing device as trusted is designated as untrusted. A new record storing the untrusted designation of the computing device that designated the certain computing device as trusted may be created and distributed for updating of local copies of the distributed database. The designation of untrusted may be recursively performed for the computing device(s) that designated as trusted computing devices that become untrusted. The untrusted computing devices may be re-designated as trusted by remaining trusted computing device(s), by transmitting validation requests, as described herein.

Each computing device executing code instructions has access to an updated copy of the distributed database. Computing devices that do not execute the code instructions, referred to herein as Legacy computing devices, may be validated based on the distributed database by one or more computing devices that do execute the code instructions.

The systems and/or methods and/or code instructions described herein provide a technical solution to the technical problem of determining whether a computing device attempting to join a network session (e.g., IoT instance) is trusted. The technical solution described herein further addresses the technical problem of revoking the trust designation of the computing device when the computing device is suspected or known to be untrusted.

The systems and/or methods and/or code instructions described herein improve performance of the network session (e.g., IoT instance), computing devices participating in the network sessions, and/or performance of the network transmitting data associated with the network session. The improvement in performance is obtained, for example, by improved network security. Improved security is provided, for example, by maintenance of copies of the distributed database using calculated values (e.g., using a hash function) based on one or more earlier records and/or blocks in the sequence. Changing any record within the distributed database by a malicious entity without detection is difficult if not impossible, since such changes are quickly detected when verification of a new record for addition to the sequence fails. Malicious tampering with the distributed database is reduced or prevented.

The systems and/or methods and/or code instructions described herein improve an underlying process within the technical field of network security, in particular within the field of securing computing devices associated with a network session (e.g., IoT instance).

The systems and/or methods and/or code instructions described herein generate new data, which is physically stored in a location of a memory storage device. The new data includes the newly generated record, which may be locally generated by a computing device participating in a network session, and/or received from another computing device associated with the computing device participating in the network session.

The systems and/or methods and/or code instructions described herein are tied to physical real-life components, include one or more of: computing devices (e.g., which may include sensors), hardware processor(s) that executes code instructions, a data storage device that stores the code instructions, and networking equipment that transmits data associated with the network session (e.g., IoT instance) between computing devices.

Accordingly, the systems and/or methods described herein are necessarily rooted in computer technology to overcome an actual technical problem arising in security of computer networks, in particular, security of computing devices participating in an IoT instance.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term trust state means a value indicative of the trust level associated with a certain computing device. The trust state may be implemented as a binary value, for example, trusted or untrusted. The value of the trust state is referred to herein as trust designation, or untrusted designation. The trust state may be implemented as a trust score, denoting a parameter with multiple variables (e.g., discrete or continuous) indicative of validity, for example, a scale from 0 to 1, where 0 denotes untrusted and 1 denotes trusted. The trusted or untrusted designation may be determined centrally (e.g., according to a set of rules, and/or threshold stored on a server) such that computing devices interpret the trust score in a common manner, and/or per computing device (e.g., according to a set of rules and/or threshold stored on the computing device). For example, for a trust score of 0.7, one computing device may determine a trust designation according to one threshold, and another computing device may determine an untrusted designation according to another threshold.

As used herein, the term trust parameter means an implementation based on the trust score (i.e. a value, such as a real number or integer, interpreted by another computing device) and/or a trust state (i.e., a binary variable storing a designation value indicating trusted or untrusted). Throughout the description, the terms trust parameter, trust score, and trusted designation or untrusted designation are sometimes interchangeable, and use of one term does not necessarily limit the implementation.

As used herein, the term validate sometimes means designated as trusted.

As used herein, a computing device associated with an untrusted designation means a computing device that has not yet been validated (as described herein), and/or has been determined (e.g., by another computing device) to be questionable.

As used herein, a computing device associated with a trusted designation means a computing device that has been validated (as described herein), and may be joined to the network session, for example, to the IoT instance.

Figure 2:
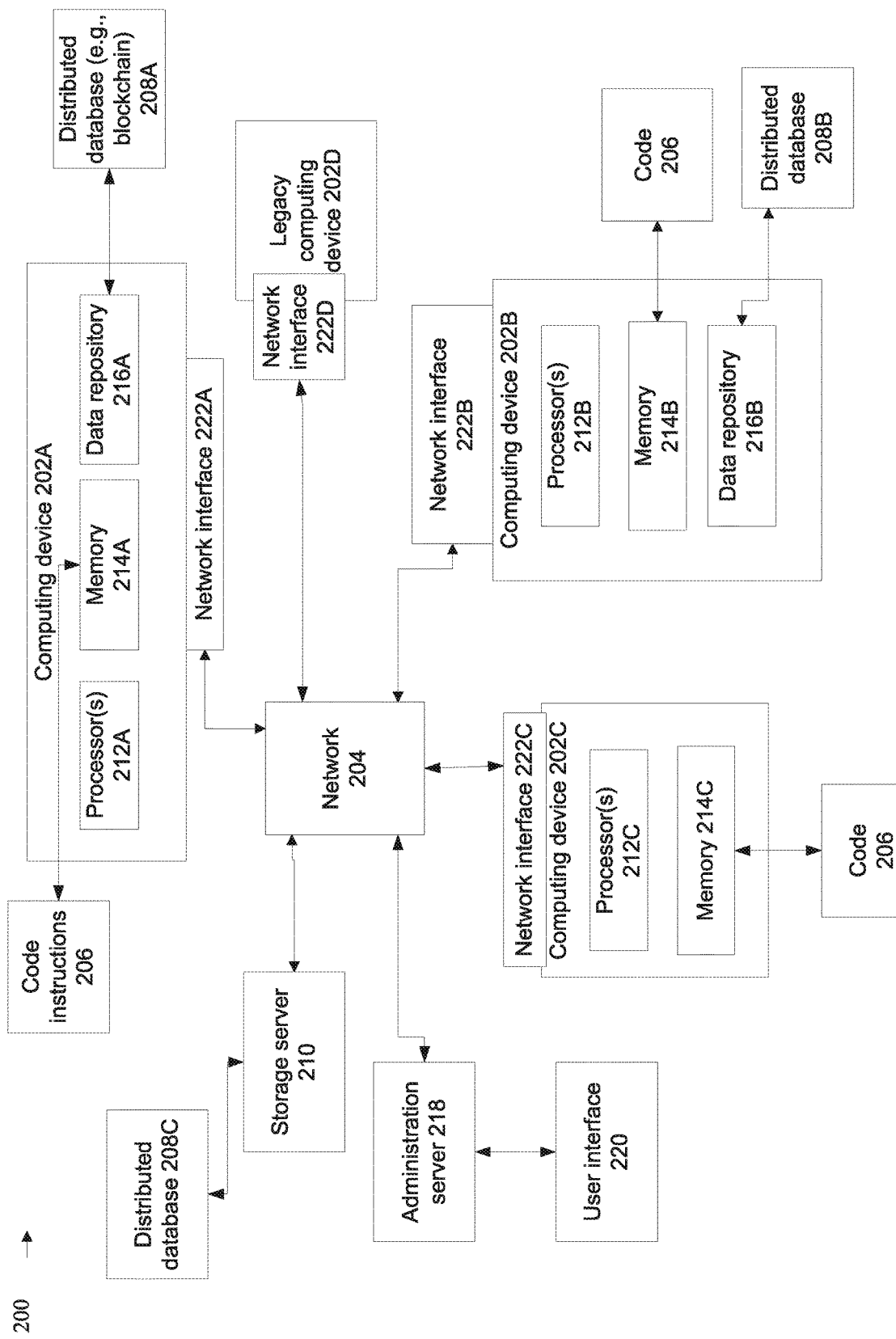
FIG. 2 is a schematic of components of a system for managing a distributed database that includes records, with each record storing a trusted or untrusted designation of a respective network connected computing device, in accordance with some embodiments of the present invention.
Figure 3:
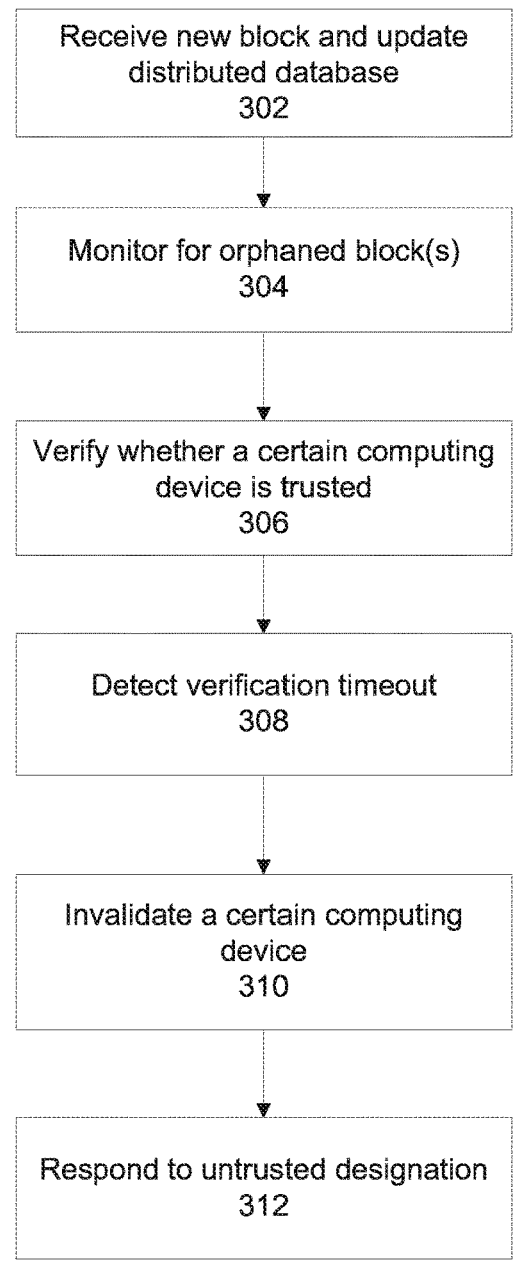
FIG. 3 is a flowchart of a process of additional features for managing the distributed database, in accordance with some embodiments of the present invention.

Reference is now made to FIG. 1, which is a flowchart of a process of managing a distributed database that includes records, with each record storing a trusted or untrusted designation of a respective network connected computing device, in accordance with some embodiments of the present invention. The distributed database stores a history of the computing devices that performed the trusted or untrusted designation of the other computing devices. Reference is also made to FIG. 2, which is a schematic of components of a system 200 for managing a distributed database that includes records, with each record storing a trusted or untrusted designation of a respective network connected computing device, in accordance with some embodiments of the present invention. Reference is also made to FIG. 3, which is a flowchart of a process of additional features for managing the distributed database, in accordance with some embodiments of the present invention.

Computing devices 202A-C are participating (and/or attempting to participate) in a network session over a network 204, for example, an IoT instance. It is noted that three computing devices are shown for example purposes and simplicity of explanation, while the actual number of computing devices may be smaller (e.g., two) or greater, for example, on the order of 10s, 100s, 1000s, 10000s, or greater. It is noted that each computing device 202A-C does not necessarily communicate directly with the other computing devices.

Computing device 202D represents a computing device that does not execute code instructions 206, also referred to herein as a legacy computing device, as described herein.

Computing devices 202A-D may be implemented as, for example, a client terminal, a mobile device, a stationary device, a desktop computer, a server, a smartphone, a laptop, a tablet computer, a wearable computing device, a glasses computing device, a watch computing device, and one or more sensors.

One or more computing devices 202A-B store a respective copy of distributed database 208A-B. Alternatively or additionally, one or more copies of distributed database 208C are stored by a storage server(s) 210. Distributed database 208C may be accessed by computing devices that do not store their own copy of the distributed database, for example, computing device 202C accesses distributed database 208C hosted by storage server 210. Distributed databases stored on computing devices may also be accessed by computing devices that do not store their own copy of the distributed database, for example, computing device 202C accesses distributed database 208A held by computing device 202A.

Computing devices 208A-C may store one or more of the following (e.g., in a memory and/or data repository associated with the respective computing device):

Unique public key and private key pair, and code instructions for performing cryptographic functions using the public and private keys. Public keys may be stored in records of the distributed database (as described herein) for access by trusted computing devices for facilitating encrypted communication between the trusted devices. The encryption increases the difficulty of monitoring and/or spoofing the encrypted communication by malicious computing devices.

Code instructions for transmitting messages over network 204, the messages including one or more of: unique identifier of the respective computing device, description of the computing device (e.g., function, hardware), and unique public key of the respective computing device.

Code instructions for encrypted network communication with other computing devices.

Code instructions 206 for accessing the distributed database, and/or for creating new records for updating the distributed database, and/or for updating the distributed database according to a received new record.

Code instructions for locally hosting a copy of the distributed database, and/or for accessing a copy of the distributed database hosted on a remote storage server (e.g. server 210).

Code instructions for querying one or more trust-resources to determine whether a certain computing device is trusted.

Each computing device 208A-C includes a respective processor 212A-C that executes code instructions 206 stored in a respective memory (and/or other data storage device, also referred to as a program store) 214A-C. Processor(s) 212A-C may be implemented as, for example, central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 212A-C may be implemented as a single processor, a multi-core processor, and/or a cluster of processors arranged for parallel processing (which may include homogenous and/or heterogeneous processor architectures).

Respective memories 214A-C may be implemented as, for example, a hard drive, a random access memory (RAM), read-only memory (ROM), an optical drive, an external storage device, and/or other storage devices. It is noted that processor(s) 212A-C may be designed to implement in hardware one or more features that would otherwise be stored as code instructions 206 by respective memories 214A-C.

One or more computing devices 202A-B may include a respective data storage device 216A-B that stores data, optionally storing respective copies of distributed database 208A-B. As discussed, computing devices that do not store a copy of the distributed database on a data storage device (e.g., computing device 202C) may access a copy (e.g., distributed database 208C) stored on an external storage device (e.g., storage server 210), or access a copy of a distributed database (208A-B) stored on other computing devices (202A-B). Data storage devices 216A-B may be implemented as, for example, a random access memory (RAM), read-only memory (ROM), non-volatile memory, magnetic media, semiconductor memory devices, hard drive, removable storage, optical media (e.g., DVD, CD-ROM), a remote storage server, and a computing cloud.

Network 204 may be implemented, for example, as one or more of: a wire based network (e.g., Ethernet), a wireless based network, the internet, a local area network, a wide area network, a virtual private network, a cellular network, a short range wireless network, a mesh network, and an ad-hoc network. Network 204 may be implemented using one or more protocols and/or network architectures.

Optionally, a central administration server 218 in communication with computing devices 202A-C (and/or one or more of computing devices 202A-C themselves) may be in communication with a user interface 220 that presents data to a user and/or includes a mechanism for entry of data, for example, one or more of: a touch-screen, a display, a keyboard, a mouse, voice activated software, and a microphone. For example, a request for validation of a certain computing device may be presented within a graphical user interface (GUI) presented on the screen, as described herein. The user may manually validate the certain computing device as trusted with the GUI.

Each computing device 202A-C includes a respective network interface 222A-C for communicating with network 204, for example, physical and/or virtual components, for example, one or more of, antenna(s), network interface card(s), a wire port, a virtual interface implemented in software, network communication software providing higher layers of network connectivity, an application programming interface (API), a software development kit (SDK), and/or other implementations.

Referring now back to FIG. 1, the process described with reference to FIG. 1 is implemented by component of system 200 described with reference to FIG. 2, based on one or more features stored as code instructions 206 executable by a respective processor(s) of a computing device(s). The process described with reference to FIG. 1 is described as executed by one computing device (e.g., computing device 202A), however it is understood that the process may be executed by one or more of the non-legacy computing devices having code instructions 206 stored thereon. Some acts of the process described with reference to FIG. 1 and/or FIG. 3 are described with reference to one, two, or three computing devices depicted in FIG. 2. It is noted that the examples are described for clarity and simplicity and are not necessarily limiting in terms of which computing devices are participating and/or how many computing devices are participating, for example, a larger number of computing devices and/or computing devices not shown may be included.

At 102, when no distributed database associated with the network session (e.g., with the IoT instance) exists, a new distributed database is created. The distributed database may be created by one or more computing devices, for example, by computing device 202A.

When no computing devices designated as trusted are detected by computing device 202A and/or when no distributed database is detected by computing device 202A, computing device 202A creates a new distributed database storing a record that includes the unique identifier (e.g., MAC address) indicative of computing device 202A and a trust designation of computing device 202A. The new distributed database may be forwarded over network 204 to other computing devices for local storage and management.

Optionally, the distributed database is arranged based on block-chain architecture. Each record is stored in a block of the block-chain. Blocks are linked to one another, which defines an order of events denoted by the respective blocks. Each block includes the record and a respective block header storing data. The data of the block header may be used for validation of the authenticity of the block, and/or to detect malicious attempts to modify one or more records in the sequence. The block header may store a calculated nonce and/or other data calculated based on other blocks in the sequence (e.g., hash value based on data of the previous block, Merkel hash calculated based on all previous blocks in the sequence, a timestamp, and/or block sequence number) that may be used to verify that the block was created by an authorized source, optionally a trusted network connected computing device. The block header may store data used for linking blocks to each other, and/or for organizing the blocks in sequence, for example, a timestamp and/or sequence number.

Each computing device locally stores a copy of the distributed database on a storage device, and/or has access to a copy of the distributed database stored on an external storage device (e.g., storage server). The copies are identical or similar (i.e., accounting for errors in distribution of updates, time delays of receiving updated records, and/or attempts at tampering), allowing each computing device to access a respective copy to obtain required data. Each computing device updates its own locally stored copy based on new records it adds itself, and based on new records received from other computing device.

Figure 4:
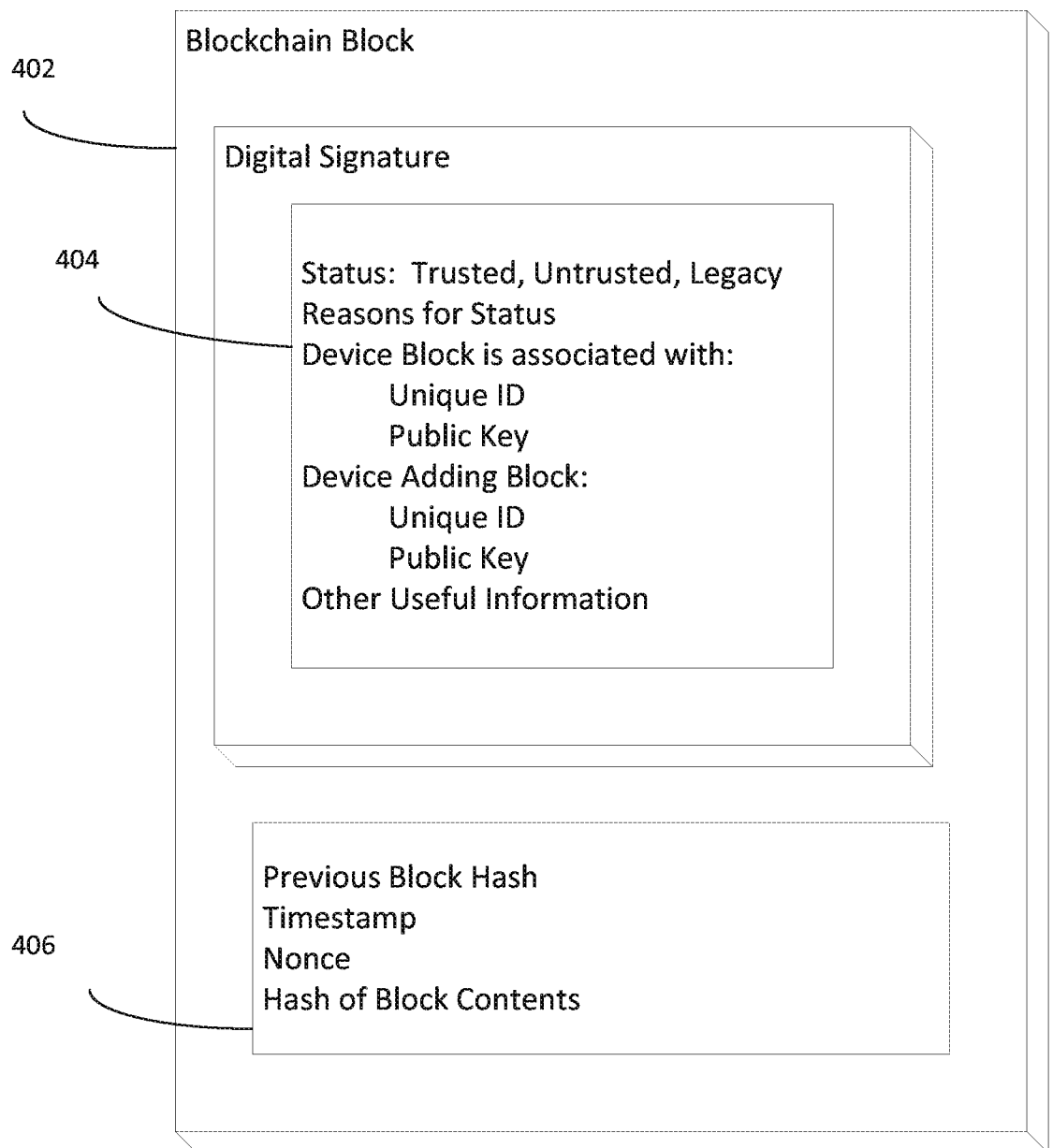
FIG. 4 is a schematic of an exemplary record of the distributed database implemented as a block in a blockchain, in accordance with some embodiments of the present invention.

Reference is now made to FIG. 4, which is a schematic of an exemplary record of the distributed database implemented as a block 402 in a blockchain, in accordance with some embodiments of the present invention. Block 402 includes a digital signature 404 and a block header 406.

Block 402 includes one or more of the following:

Status, denoting the designation of computing device associated with block 402 as trusted, untrusted, or legacy. Alternatively, a score (e.g., a value between 0.0 and 1.0) may be stored. Other computing devices may interpret the score as trusted or untrusted according to a set of rules (e.g., threshold).

A unique identifier of the computing device associated with the record, for example, a MAC (media access control) address, a hardware code, serial number, and/or other network address.

Unique public key of the computing device associated with the record. It is noted that this field may be omitted when the computing device is designated as untrusted.

A unique identifier of the computing device that performed the validation of the computing associated with the record or that designated the computing associated with the record as untrusted, for example, a MAC address, a hardware code, serial number, and/or other network address. It is noted that this field may be omitted for the first record of the blockchain, since the computing device that created the first record may designate itself as trusted.

A unique public key of the computing device that validated the computing device associated with the record, designated the computing device associated with the record as untrusted, or validated the legacy computing device associated with the record. It is noted that this field may be omitted for the first record of the blockchain, since the computing device that created the first record may designate itself as trusted.

Additional information, for example, which trust-resources were accessed for validation of the computing device, reasons for the untrusted designation, and/or descriptions of the computing device associated with the record and/or the computing device that validated the computing device associated with the record.

Digital signature 404 may be created using the private key of the computing device that validated the computing device associated with the record (which may be the computing devices that creates block 402) by signing the data items described above. Another computing device verifies the computing device that validated the computing device associated with the record, with a public key of the computing device that validated the computing device associated with the record that corresponds to the private key.

Optionally, code instructions 206 corrupt and/or delete the private key in response to unexpected changes to the firmware, code instructions 206, operating state, and/or internal memory. Damaging the private key in response to compromise of the computing device triggers other computing devices to designate the compromised computing device as untrusted, reducing or preventing damage caused by the compromised computing device.

Block header 406 stores data according to the implementation of the block chain, for example, the hash of the previous block in the chain, the hash of the current block, a nonce, and a timestamp.

Referring now back to FIG. 1, at 104, computing device 202A (which is designated as trusted based on one or more records stored in the distributed database) receives over network 204, a validation request for designation as trusted transmitted by computing device 202B, which is initially designated as untrusted.

The validation request may be transmitted in response to instructions for joining computing device 202B to the network session, for example, adding computing device 202B to the IoT instance. The validation request may be transmitted in response to a query transmitted by computing device 202A, for example, during a search for other computing devices to validate.

The validation request includes one or more of the following: unique network identifier of computing device 202B (e.g., MAC address), description of computing device 202B (e.g., function, hardware), unique public key of computing device 202B, and information for assisting in validation of computing device 202B by computing device 202A (e.g., instructions to request validation from a certain administrator).

Optionally, the feature described with reference to block 102 is executed in response to reception of the validation request. When computing device 202A receives the validation request from computing device 202B, and no distributed database is detected, and/or no trusted devices are found, the new distributed database storing the new record for computing device 202A (as described with reference to block 102) is created, and the new block storing the trusted designation of computing device 202B is added to the new distributed database.

Alternatively to 104, at 106, a legacy computing device 202D is detected, as described herein in additional detail. Legacy computing device 202D is detected without validation requests. Legacy computing device 202D does not necessarily execute code instructions 206 and does not necessarily include code instructions for transmitting the validation requests.

At 108, computing device 202A queries one or more trust-resources to determine whether computing device 202B is to be designated as trusted. (Block 108 for legacy computing device 202D is described herein in additional detail.)

Exemplary trust-resources include: a graphical user interface (GUI) and/or other message (e.g., email, text message, webpage, push notification) presented on a display (e.g., user interface 220 of administration server 218) including a mechanism for a manual user designation as trusted or untrusted, a password and/or secret key provided by computing device 202B indicative of trusted designation (e.g., according to a security server), a security server that authenticates computing device 202B according to a security protocol, computing device 202A executing a security protocol for authenticating computing device 202B, and computing device 202A executing stored code instructions indicative of validity of computing device 202B (e.g., computing device 202A expects.

Computing device 202A may communicate with computing device 202B over network 204, for example, transmitting a query for additional information for validation of computing device 202B, for example, additional information requested by the trust-resource(s) for validation of computing device 202B. The additional information may be transmitted based on the communication channel for transmission of the validation request, for example, packets may be routed along the same network route.

At 110, when computing device 202A is unable to validate computing device 202B, the validation request is transmitted to another computing device 202C for attempted validation of computing device 202B. Computing device 202A may be unable to validate computing device 202B, for example, due to inability to access the trust-resource(s), an error is processing the validation request, and/or receiving an untrusted designation from the one or more trust-resources.

The validation request may be transmitted to multiple computing devices (each designated as trusted) until at least one of the computing devices succeeds in obtaining a trusted designation for computing device 202B. Alternatively, the transmitting of the validation request is terminated when a requirement is reached, for example, a limit on the number of computing devices that attempt to validate computing device 202B without obtaining the trusted designation.

Computing device 202B remains in the untrusted state until one of the other computing devices designated as trusted is able to validate computing device 202B as trusted. When no computing devices are able to validate computing device 202B, computing device 202B remains in the untrusted state until validation occurs.

When computing device 202B is in the untrusted state, computing device may transmit (e.g., broadcast) another validation request (e.g., as described with reference to act 104) in an attempt for validation by some computing device designated as trusted. For example, when trust-resource(s) take a long time to perform the validation (e.g., waiting for a response from a human user), and/or the trust-resource is in a sleep-state and/or not in communication with one or more computing devices.

At 112, when computing device 202B is validated as trusted, the computing device that performed the successful validation (e.g., computing device 202A) creates a new record, optionally a new block. The new record stores the trust designation (and/or trust score) of computing device 202B, a unique identifier (e.g., MAC address) indicative of computing device 202B, and a unique identifier indicative of computing device 202A (i.e., of the computing device that successfully validated computing device 202B as trusted). The new record may include the public key of computing device 202B and/or the public key of computing device 202A (i.e., of the computing device that successfully validated computing device 202B as trusted).

The new record is added to the local copy of distributed database 208A stored by computing device 202A (when such local copy is available). Alternatively or additionally, the new record is added to a remote copy of distributed database 208C stored on storage server 210, for example, when the remote copy is managed by computing device 202A. Optionally, when computing device 202B cannot be validated, and/or when computing device 202B is untrusted, the new record is created with the designation of untrusted.

At 114, the new record may be transmitted over network 204 to other computing devices (e.g., computing device 202C) and/or storage servers (e.g., server 210) for local verification and updating of respective locally stored copies of the distributed database.

Optionally, the new record is validated by the receiving computing device prior to updating of the local copy of the distributed database. The validation of the new record may be performed by verifying that the new record was actually created by the computing device having an indication stored in the new record (e.g., computing device 202A). The validation of the new record may be performed according to a digital signature stored in the new record. The digital signature is encrypted with the private key of the computing device that validated the computing device associated with the new record (e.g., computing device 202A). The verification may be performed by the receiving computing device, by decrypting the digital signature with the public key stored in the new record.

Alternatively or additionally, the validation is performed by comparing the public key of the computing device that validated the computing device associated with the new record (e.g., computing device 202A) with the public key of computing device 202A stored in an earlier record in which computing device 202A is validated and designated as trusted (i.e., by another computing device). The new record is validated when the public key remains constant between the earlier record and the new record. When the public keys do no match, the new record is not added to the distributed database, and/or is ignored, and/or is orphaned when the new record is added prior to validation. Conflicts and/or inconsistencies between copies of the distributed database may be managed, for example, by computing scores for different versions of records for selection of the most likely version to add to the distributed database.

Reference is now made to FIG. 3, which includes additional features for management of the distributed database. The process described with reference to FIG. 3 is implemented by components of system 200 described with reference to FIG. 2, based on one or more features stored as code instructions 206 executable by a respective processor(s) of a computing device(s). The process described with reference to FIG. 3 is described as executed by one computing device (e.g., computing device 202A), however it is understood that the process may be executed by one or more of the non-legacy computing devices having code instructions 206 stored thereon.

At 302, a new record is received over network 204 (created by another computing device) for insertion in the copy of the distributed database managed by computing device 202A. When computing device 202A verifies that the new record was created by another computing device designated as trusted, the local copy of the distributed database is updated according to the new record.

At 304, the local copy of the distributed database (e.g., managed by computing device 202A) is monitored to detect orphaning of one or more records. Orphaning may be detected when a fork occurs at a certain record, with one of the chains terminating, and the other chain growing in size with new records being added. The orphaned records may be added to the longest validated chain of records of the copy of the distributed database.

At 306, computing device 202A determines whether computing device 202C is designated as trusted, for example, before computing device 202A transmits data to computing device 202C.

To determine whether computing device 202C is designated as trusted, computing device 202A accesses one or more copies of the distributed database to identify the latest record storing a unique identifier indicative of computing device 202C. The latest record may be found by searching backwards along the linked records of the distributed database to identify the record storing the unique identifier indicative of computing device 202C with the newest timestamp.

When the latest record indicates that computing device 202C is designated as untrusted, and/or when no records exist in the distributed database indicative of computing device 202C, then computing device 202A considers computing device 202C as untrusted.

Alternatively, when the identified latest record includes a designation of trusted for computing device 202C, computing device 202A obtains a unique identifier of the computing device that validated computing device 202C from the latest record. Computing device 202A may further validate the latest record, for example, by evaluating the validity of the digital signature stored in the latest record.

Computing device 202A searches the distributed database for the latest record storing the trust state of the computing device that validated computing device 202C. When the computing device that validated computing device 202C is designated as untrusted and/or no record exists in the distributed database for the computing device that validated computing device 202C and/or the public key of the computing device that validated computing device 202C stored in the latest record of computing device 202C does not match the public key of the computing device 202C stored in the latest record of the computing device that validated computing device 202C, computing device 202C is designated as untrusted.

It is noted that the latest record may be the initial block created for a new distributed database (as described with reference to act 102). In such a case no record exists for the computing device that validated computing device 202C, since computing device 202C created the originating record. When the original record is created by computing device 202C, computing device 202C is designated as trusted. The record may be validated, for example, when the digital signature matches the public key.

Alternatively, when the computing device that validated computing device 202C is designated as trusted, computing device 202A may traverse records of the distributed database to iteratively identify each computing device that designated the computing device of the current record as trusted. The iteration may terminate after a predefined number of computing devices are found designated as trusted, a predefined number of records are searched, and/or may terminate when the last possible record (e.g., the original record) is reached. Two or more records created by different trusted computing devices and/or created based on validation by different trusted-resources may be required for computing device 202A to validate computing device 202C. Alternatively or additionally, when the trust designation is based on a score, then the values of the scores of the multiple identified records may be processed to obtain a final score for computing device 202C which is evaluated to determine whether computing device 202C is trusted or untrusted, for example, a sum of the values, and/or an average of the values.

Optionally, computing device 202A further verifies that computing device 202C owns a public key stored by the identified latest record and that computing device 202C knows a private key corresponding to the public key, for example, based on one or more of the following:

Computing device 202A encrypts data (e.g., a random number and/or string) using the public key of computing device 202C obtained from the identified latest record, and transmits the encrypted data to computing device 202C with instructions to decrypt the encrypted data using the private key of computing device 202C and return the decrypted data. If the decrypted data matches the original data (before encryption), then computing device 202C is designated as trusted.

Computing device 202A transmits data (e.g., a random number and/or string) to computing device 202C with instructions to return a digital signature created based on the private key of computing device 202C. Computing device 202C is designated as trusted when the digital signature matches the public key of computing device 202C obtained from the identified latest record.

Computing device 202A encrypts a symmetric encryption key (e.g., based on AES-256 encryption) for transmission to computing device 202C using the public key of computing device 202C obtained from the identified latest record. The symmetric encryption key may be decrypted using the private key of computing device 202A. The encryption key may be used to encrypt communication between computing device 202A and 202C.

At 308, the validation of computing device 202C by computing device 202A (as described with reference to act 306) is associated with a timeout requirement, for example, predefined interval of time.

When the timeout requirement is met (e.g., the interval of time is exceeded, and/or a timeout counter expires), computing device 202C may be designated as untrusted. Computing device 202A may create an updated record storing the untrusted designation of computing device 202C, the unique identifier of computing device 202C, and the unique identifier of computing device 202A. The update record is transmitted over network 204 for local verification and update of copies of the distributed database.

Computing device 202C is re-validated by computing device 202A when the timeout interval expires and when computing device 202C is designated as untrusted. The validation may be triggered when the validation request is received by computing device 202A from computing device 202C (as described with reference to act 104). The periodic re-verification prevents or reduces the risk of a malicious computing device posing as the trusted computing device 202C to computing device 202A for extended periods of time.

Optionally, another computing device that operates based on the validation of computing device 202C by computing device 202A (e.g., the another computing device transmits data to the validated computing device 202C) monitors updates of the distributed database (e.g., new records) to detect when computing device 202A and/or computing device 202C are designated as untrusted. When the another computing device detects that computing device 202A and/or computing device 202C are designated as untrusted, the another computing device revokes the validation of computing device 202C and terminates operation based on the validation, for example, when computing device 202A and/or 202C is untrusted the another computing device stops transmission of the data to computing device 202C.

At 310, computing device 202A invalidates the trust designation of computing device 202B by designating computing device 202B as untrusted. For example, computing device 202A invalidates the trust designation of computing device 202B when computing device 202A determines that computing device 202B has been replaced, compromised, and/or behaving suspiciously. For example, computing device 202A observes that computing device 202B accesses unexpected and/or restricted resources, computing device 202B actively interferes with the storage of the distributed database, and/or a notification is transmitted from a trust-resource (e.g., manually entered by an administration using user interface 220 of administration server 218 with instructions to invalidate computing device 202B).

Computing device 202A creates another new record storing the untrusted designation of computing device 202B, the unique identifier indicative of computing device 202B, and the unique identifier of computing device 202A. Optionally, the another new record stores the public key of computing device 202A. Optionally, the another new record stores information indicating why computing device 202A determined that computing device 202B is untrusted.

When computing device 202B is designated as untrusted, computing device 202A optionally designates as untrusted the computing devices that were designated as trusted by computing device 202B, for example, the recently designated computing devices according to a requirement and/or all computing devices. The copy of the distributed database is traversed to identify the computing devices designated as trusted by computing device 202B. New records are created to designate as untrusted each of the identified computing devices designated as trusted by computing device 202B. Each record stores the unique identifier of the respective identified computing device designated as trusted by computing device 202B, and the unique identifier of computing device 202A. The new record(s) are distributed over network 204 for local verification and update of respective copies of the distributed database. The remaining computing devices designated as trusted may perform a re-validation of the computing devices designated as untrusted, as described with reference to block 104 of FIG. 1.

The public key(s) stored in the distributed database enable computing devices that remain designated as trusted, to securely query (e.g., using encryption and/or digitally signed responses) computing device 202A that designated computing device 202B as untrusted regarding the reason(s) that computing device 202B is designated as untrusted. The reason(s) may be useful, for example, when determining which computing devices designated as untrusted may be re-designated as trusted. When computing device 202B is unable to respond (e.g., computing device 202B doesn't know the private key associated with the public key stored in the record of the distributed database associated with computing device 202B), then the designation of computing device 202B remains untrusted.

The distributed database records the order in which trusted or untrusted designations occur. The order of the records indicates whether the trusted designation or the untrusted designation occurred last. Computing devices accessing the distributed database assume that the information stored in the more recent record is correct. Potential conflicts may occur, for example, when two or more different computing devices are validating computing device 202B at a similar time interval. For example, when both computing devices receive the validation requests transmitted by computing device 202B. One computing device determines that computing device 202B is trusted, while the other computing device determines that computing device 202B is untrusted. Both computing devices create records with their respective determined designations, and transmit the records over the network for updating of copies of the distributed database. When the record storing the trusted designation is added first and the record storing the untrusted designation is added second, the distributed database represents a secure situation, in which computing device 202B is designated as untrusted, requiring a re-validation for designation as trusted. However, when the record storing the untrusted designation is added first followed by the record storing the trusted designation, a vulnerable security situation arises in which a compromised and/or malicious computing device may appear to other computing devices as trusted. The computing device that designated computing device 202B as untrusted monitors records and/or the distributed database to make sure that the untrusted designation record takes priority over other records created within a time requirement that designate the computing device as trusted.

Computing device 202A may monitor the distributed database to verify that the record designating computing device 202B as untrusted supersedes other record(s) designating computing device 202B as trusted, for example, that the record designating computing device 202B is located later in the distributed database and/or has a timestamp indicating a later event.

Computing device 202A may monitor for a new record received over network 204 storing a trusted designation of computing device 202B, where the new record is created within a time requirement of the creation of the record designating computing device 202B as untrusted, for example, within 1 second of each other, within 1 minute, or within 1 hour.

Computing device 202A may analyze data stored in the new record storing the trusted designation of computing device 202B to determine whether the new record was created based on validation request transmitted by computing device 202B or created as a response to the distributed record that designated computing device 202B as untrusted.

Computing device 202A re-creates the record designating computing device 202B as untrusted and including a time parameter indicating that the record designating computing device 202B as untrusted denotes a later event than the record designating computing device 202B as trusted. It is noted that the record may not necessarily be automatically re-created where the record designating computing device 202B as trusted is created in response to the untrusted designation, unless computing device 202B has evidence that computing device 202A is untrusted.

The re-created record is distributed for update of copies of the distributed database where the re-created record designating computing device 202B as untrusted is placed at a relatively more recent position than the record designating computing device 202B as trusted.

At 312, computing device 202A (which was previously designated as trusted) detects that another computing device 202B designated computing device 202A as untrusted. For example, computing device 202A receives a new record storing an untrusted designation of computing device 202A, and the unique identifier of computing device 202B that performed the untrusted designation and/or that created the new record.

Computing device 202A may designate computing device 202B (which designated computing device 202A as untrusted) as untrusted, by creating another new record storing the untrusted designation of computing device 202B, the unique identifier of computing device 202B, and the unique identifier of computing device 202A. The another new record is distributed over network 204 for local verification and update of respective copies of the distributed database.

By responding to the designation of computing device 202A as untrusted and creating a new record designating computing device 202B as untrusted, the risk of a malicious device being able to remove existing trusted computing devices from the network session (e.g., IoT instance) while retaining access to the network session is prevented or reduced.

Optionally, a single computing device is prevented from designating all (or most) of the computing devices participating in the network session (e.g., IoT instance) as untrusted, for example, by limiting the number of computing devices that a single computing device may designate as untrusted (e.g., according to a requirement), and/or preventing a new computing device designated as untrusted from designating existing trusted computing devices as untrusted with the exception of the trusted computing device(s) that marked the new computing device as untrusted.

Computer device 202A may request a re-designation of trusted by transmitting a validation request over the network to another computing device designated as trusted, as described with reference to act 104 of FIG. 1.

Referring now back to act 106 of FIG. 1, the processing of legacy computing device 202D is described with reference to the above discussed acts of FIG. 1 and/or FIG. 3, which are executed by computing device 202A (or other computing devices) that executes code instructions 206. Legacy computing device 202D, which does not execute code instructions 206 and does not transmit validation requests, is processed based on a variation of the method described with reference to FIG. 1 and/or FIG. 3. Computing devices 202A-C designated as trusted which execute code instructions 206 may vouch for legacy computing device 202D to participate in the network session (e.g., IoT instance).

Focus is placed on features associated with processing of legacy computing device 202D. Similar features associated with processing of legacy computing device 202D and computing devices executing code instructions 206 may be omitted for clarity.

At 108, one or more trust-resources are queried to determine whether legacy device 202D is designated as trusted, as described herein.

At 112, when a trusted designation is obtained from the trust-resource, a new record storing the trust designation of legacy computing device 202D is created. The record stores a legacy designation of legacy computing device 202D, the unique identifier (e.g., MAC address) indicative of computing device 202A that vouches for legacy computing device 202D, and the unique identifier (e.g., MAC address) of legacy computing device 202D. The new record may store the unique public key of computing device 202A (legacy computing device 202D may not necessarily store and/or be associated with a public and/or private key).

At 114, the new record is distributed over network 204 for local verification and update of respective copies of the distributed database, as described herein. Other computing devices may confirm that legacy computing device 202D is designated as trusted by accessing the new record stored in the distributed database.

At 306, another computing device (e.g. 202B) may validate that legacy computing device 202D is designated as trusted by accessing the new record stored in one or more copies of the distributed database (as described with reference to act 114). The new record is identified according to the unique identifier indicative of legacy computing device 202D.

When the identified record storing the unique identifier of legacy computing device 202D includes a designation of trusted, computing device 202B accesses the unique identifier of the computing device that validated legacy computing device 202D.

The legacy computing device 202D is designated as trusted when the record associated with computing device 202B that designated legacy computing device 202D as trusted indicates that computing device 202B is designated as trusted (i.e., computing device 202B is designated as trusted by another computing device). The distributed database may be recursively traversed to identify computing devices designated as trusted, as described herein.

Alternatively, legacy computing device 202D is designated as untrusted when the record associated with legacy computing device 202D indicates that legacy computing device 202D is designated as untrusted, when the computing device that designated legacy computing device 202D is designated as untrusted, and/the computing device that designated legacy computing device 202D is not authenticated.

At 308, the validation of legacy computing device 202D by computing device 202B (as described with reference to act 306) is associated with a timeout requirement, for example, predefined interval of time.

When the timeout requirement is met (e.g., the interval of time is exceeded, and/or a timeout counter expires), legacy computing device 202D may be designated as untrusted. Computing device 202B may create an updated record storing the untrusted designation of legacy computing device 202D, the unique identifier of legacy computing device 202D, and the unique identifier of computing device 202B. The update record is transmitted over network 204 for local verification and update of copies of the distributed database.

Legacy computing device 202D is re-validated by computing device 202B when the timeout interval expires and when legacy computing device 202D is designated as untrusted. The periodic re-verification prevents or reduces the risk of a malicious computing device posing as the trusted legacy computing device 202D to computing device 202B for extended periods of time.

Optionally, another computing device that operates based on the validation of legacy computing device 202D by computing device 202B (e.g., the another computing device transmits data to the validated legacy computing device 202D) monitors updates of the distributed database (e.g., new records) to detect when legacy computing device 202D and/or computing device 202B are designated as untrusted. When the another computing device detects that computing device 202B and/or legacy computing device 202D are designated as untrusted, the another computing device revokes the validation of legacy computing device 202D and terminates operation based on the validation, for example, when computing device 202B and/or legacy computing device 202D is untrusted the another computing device stops transmission of the data to legacy computing device 202D.

At 310, computing device 202C determines that legacy computing device 202D designated as trusted by computing device 202B is untrusted. Computing device 202C creates records designating both legacy computing device 202D and computing device 202B that validated legacy computing device 202D as untrusted.

Computing device 202C creates a first new record storing the untrusted designation of legacy computing device 202D, the unique identifier indicative of the legacy computing device 202D, and the unique identifier of computing device 202B.

Computing device 202C creates a second new record storing the untrusted designation of computing device 202B that validated legacy computing device 202D, the unique identifier of computing device 202B, and the unique identifier of the computing device that validated computing device 202B.

It is noted that when computing device 202C validated legacy computing device 202D (i.e., instead of computing device 202B) then the second new record is not created so that computing device 202C does not validate itself.

The unique identifiers of computing device 202B that validated legacy computing device 202D and/or the computing device that validated computing device 202B may be found by traversing one or more copies of the distributed database.

The first and second new records are distributed over network 204 for local verification and update of respective copies of the distributed database.

Computing device 202B designated as untrusted may attempt to obtain the trusted designation by transmission of the validation request (as described with reference to block 104). When computing device 202B is re-designated as trusted, computing device 202B may re-designated legacy computing device 202D as trusted.

Figure 5:
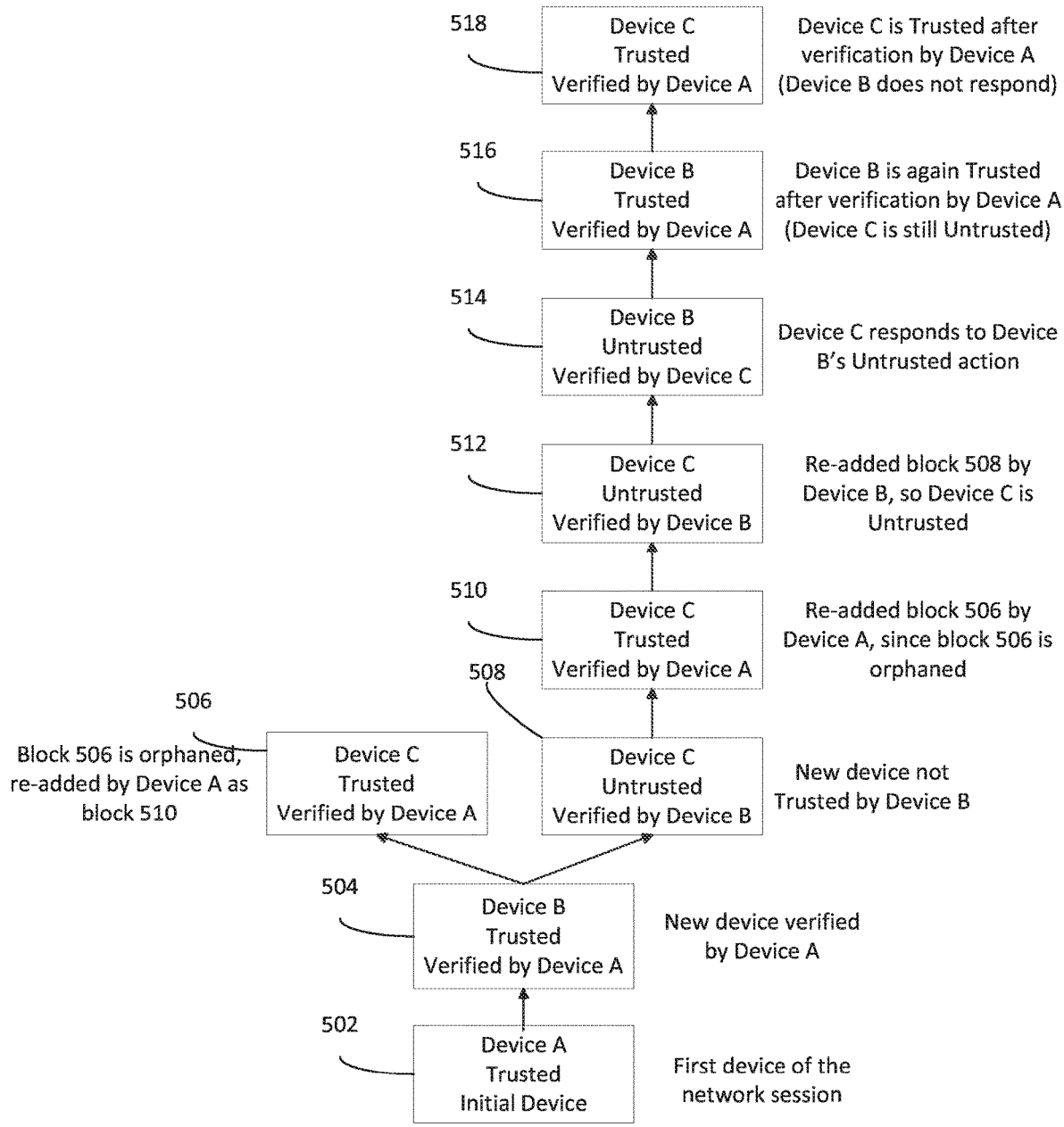
FIG. 5 is a schematic of an example of a copy of a distributed database, in accordance with some embodiments of the present invention.

Reference is now made to FIG. 5, which is a schematic of an example of a copy of a distributed database, in accordance with some embodiments of the present invention. The distributed database may be implemented as a blockchain. The distributed database depicted with reference to FIG. 5 is created based on one or more acts described with reference to FIG. 1 and/or FIG. 3, and/or implemented by system 200 described with reference to FIG. 2.

Record 502 denotes the original record created by computing device A, as described with reference to act 102 of FIG. 1.

Record 504 denotes computing device B designated as trusted by computing device A, as described with reference to act 104 of FIG. 1.

Record 506 denotes computing device C designated as trusted by computing device A. A branch is formed by record 508, which denotes computing device C designated as untrusted by computing device C.

Record 510 is created in response to detection of the orphaning of record 506, as described with reference to act 304 of FIG. 3. Record 510 is a re-creation of record 506 with a timestamp (and/or other implementation denoting ordering) denoting a later event (e.g., higher priority, newer timestamp) than record 508.

Record 512 is a re-creation of record 508 based on monitoring of the distributed database by computing device B, which detects that computing device C is designated as trusted, as described with reference to act 310 of FIG. 3. Record 512 designates computing device C as untrusted.

Record 514, which designates computing device B as untrusted is created by computing device C in response to detection of record 512 that designates computing device C as untrusted by computing device B, as described with reference to act 312 of FIG. 3.

Record 516 includes a designation of computing device B as trusted, based on a verification of computing device A. It is noted that computing device C remains designated as untrusted.

Record 518 includes a designation of computing device C as trusted, based on a verification of computing device A. It is noted that computing device B does not respond.

Figure 6:
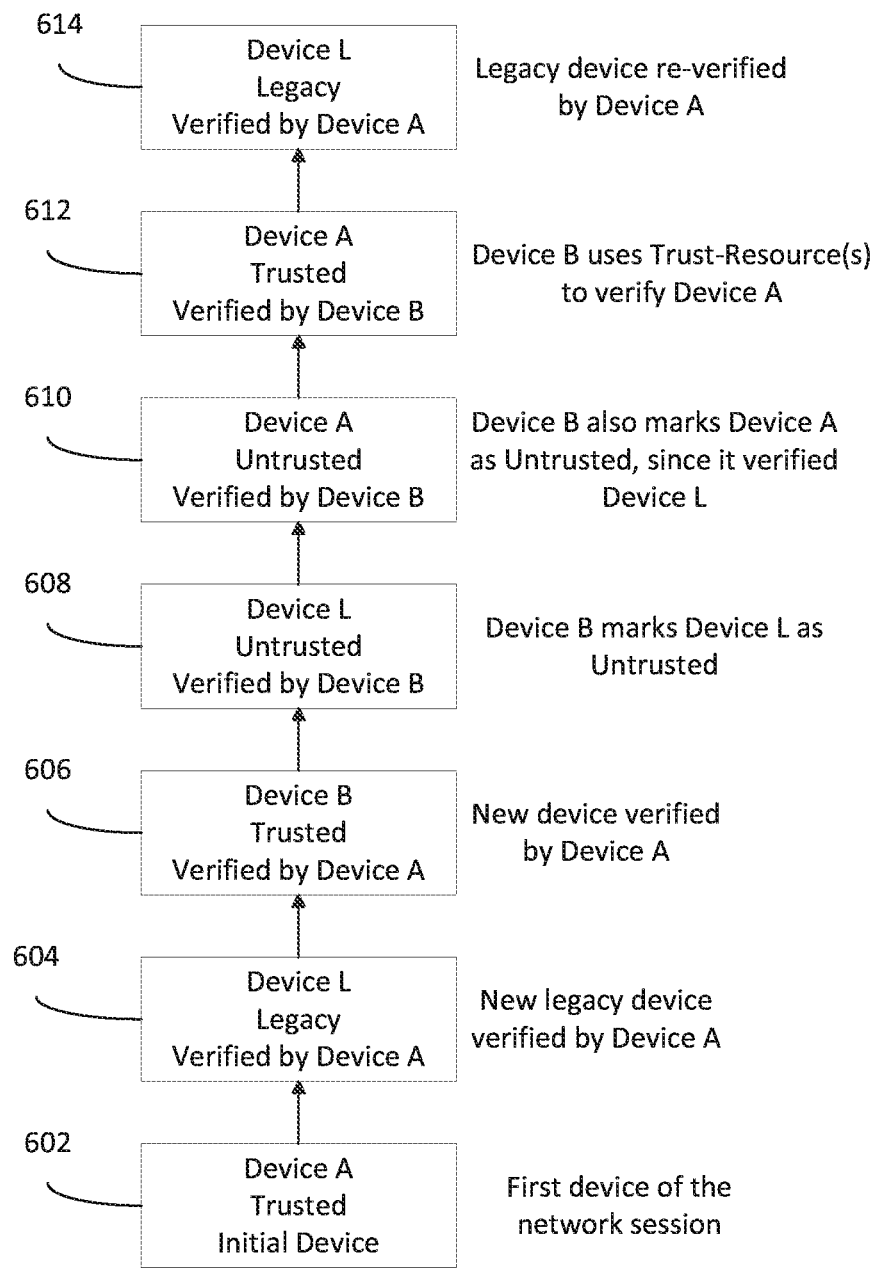
FIG. 6 is a schematic of an example of a copy of a distributed database that includes records associated with a legacy computing device, in accordance with some embodiments of the present invention.

Reference is now made to FIG. 6, which is a schematic of an example of a copy of a distributed database that includes records associated with a legacy computing device, in accordance with some embodiments of the present invention. The distributed database may be implemented as a blockchain. The distributed database depicted with reference to FIG. 6 is created based on one or more acts described with reference to FIG. 1 and/or FIG. 3 associated with act 106 of FIG. 1, and/or implemented by system 200 described with reference to FIG. 2.

Record 602 denotes the original record created by computing device A, as described with reference to act 102 of FIG. 1.

Record 604 denotes designation of legacy computing device L as trusted by computing device A, as described with reference to act 106 of FIG. 1.

Record 606 denotes designation of computing device B as trusted by computing device A, as described with reference to act 104 of FIG. 1

Record 608 denotes designation of legacy computing device L as untrusted by computing device B, as described with reference to act 310 of FIG. 3.

Record 610 denotes designation of computing device A as untrusted by computing device B, as described with reference to act 310 of FIG. 3.

Record 612 denotes designation of computing device A as trusted by computing device B, as described with reference to act 108 of FIG. 1.

Record 614 denotes re-designation of legacy computing device L as trusted by computing device A.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing devices will be developed and the scope of the term computing device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of validating a first computing device for joining a common network session operating without a central authority, based on a plurality of copies of a distributed database each storing a trust parameter indicative of a trusted or untrusted designation for each of a plurality of network connected second computing devices, the method performed by a certain second computing device designated as trusted and participating in the common network session without the central authority, the method comprising:
   receiving a validation request for designation as trusted transmitted by the first computing device designated as untrusted, wherein the first computing device designated as untrusted is prevented from joining itself to the common network session;
   querying at least one trust-resource to determine whether the first computing device should be designated as trusted or untrusted;
   when a trust parameter is obtained from the at least one trust-resource, creating a new record storing the trust parameter of the first computing device, a first unique identifier indicative of the first computing device, and a second unique identifier indicative of the certain second computing device; and
   distributing the new record over a network for local verification and updating of respective copies of the plurality of copies of the distributed database each locally stored in association with a respective second computing device,
   wherein the distributed database is arranged according to an order of creation of new records,
   wherein the first computing device is joined to the common network session by another computing device upon obtaining a trusted designation of the first computing device stored in the new record of the distributed database.

2. The method of claim 1, wherein the trust parameter is selected from the group consisting of: (i) a trust score storing a value, wherein another computing device accessing the record of the certain computing device executes code instructions for designating the certain computing device as trusted or untrusted according to the value of the trust score, and (ii) a designation of trusted or untrusted.

3. The method of claim 1, wherein the distributed database is arranged based on a block-chain architecture, wherein each record is stored in a block of the block-chain including a respective block header and a hash-value calculated from one or more previous blocks in the chain, wherein the records are stored in blocks indicative of an order of events associated with the records, wherein each respective block includes a digital signature created with a private key of a third computing device that designated the computing device associated with the respective block, wherein a fourth computing device verifies that the third computing device designated the computing device associated with the respective block with a public key of the third computing device corresponding to the private key.

4. The method of claim 1, further comprising:
   receiving a second new record for insertion in a certain copy of the distributed database managed by the certain second computing device;
   verifying creation of the second new record by another second computing device designated as trusted; and
   updating the certain copy of the distributed database with the second new record.

5. The method of claim 1, further comprising:
   monitoring a certain copy of the distributed database managed by the certain second computing device, to detect orphaning of at least one record; and
   adding the trust parameter and unique identifiers of the orphaned record to a second new record in a longest validated chain of records of the certain copy of the distributed database.

6. The method of claim 1, further comprising:
   designating the first computing device as untrusted when the certain second computing device is unable to validate the first computing device; and
   transmitting the validation request to another second computing device for attempted validation of the first computing device by the another second computing device.

7. The method of claim 1, further comprising: when no second computing devices designated as trusted are detected by the certain second computing device,
   creating a new distributed database storing a record that includes the second unique identifier indicative of the certain second computing device and a trust designation of the second computing device,
   wherein the new record storing the trusted designation of the first computing device is added to the new distributed database.

8. The method of claim 1, further comprising determining whether a third computing device is designated as trusted by performing:
   traversing records of the distributed database to iteratively identify each computing device that designated the computing device of the current record as trusted,
   querying at least one copy of the plurality of copies of the distributed database to identify the latest record storing a third unique identifier indicative of the third computing device,
   when the identified latest record storing the third unique identifier includes a designation of trusted, accessing another unique identifier of the identified latest record indicative of a fourth computing device that validated the third computing device;
   designating the third computing device as untrusted when at least one of: the fourth computing device is designated as untrusted, and the fourth computing device is not authenticated;
   verifying that the third computing device owns a public key stored by the identified latest record and that the third computing device knows a private key corresponding to the public key,
   wherein the private key corresponding to the public key is automatically corrupted when the third computing device is compromised such that the third computing device is designated as untrusted in response to the corrupted private key that does not correspond to the public key.

9. The method of claim 1, further comprising:
designating the first computing device as untrusted when a timeout associated with the trust designation of the first computing device is met;
creating an updated record storing the untrusted designation of the first computing device, the first unique identifier, and the second unique identifier; and
distributing the updated record over the network for local verification and updating of respective copies of the plurality of copies of the distributed database.

10. The method of claim 1, further comprising:
determining that a third computing device designated as trusted should be untrusted;
creating a second new record storing the untrusted designation of the third computing device, a third unique identifier indicative of the third computing device, and the second unique identifier;
traversing at least one copy of the distributed database to identify at least one fourth computing device that designated the third computing device as trusted;
creating at least one third new record each storing an untrusted designation of each respective fourth computing device, a fourth unique identifier indicative of the respective fourth computing device, and the second unique identifier;
distributing the second new record and the at least one third new record over the network for local verification and updating of respective copies of the plurality of copies of the distributed database;
monitoring for a fourth new record received over the network storing a trusted designation of the third computing device, wherein the fourth new record is created within a time requirement of the creation of the second new record;
re-creating the second new record, wherein the re-created second new record stores an order parameter indicating that the plurality of copies of the distributed database are updated by designating the re-created second new record as more recent over the fourth new record; and
distributing the re-created second new record over the network for local verification and updating of respective copies of the plurality of copies of the distributed database.

11. The method of claim 1, further comprising:
receiving a second record over the network storing an untrusted designation of the certain second computing device, and a third unique identifier of a third computing device that created the second record;
creating a third record storing an untrusted designation of the third computing device, the third unique identifier, and the second unique identifier;
distributing the third record over the network for local verification and updating of respective copies of the plurality of copies of the distributed database; and
transmitting over the network, a second validation request for designation of the certain second computing device as trusted.

12. The method of claim 1, further comprising:
detecting a third computing device without the third computing device transmitting the validation request for designation as trusted;
querying at least one trust-resource to determine whether the third computing device is designated as trusted;
when a trusted designation is obtained from the trust-resource, creating another new record storing the trust designation of the third computing device, a legacy designation of the third computing device indicative of lack of transmission of the validation request by the third computing device, a third unique identifier indicative of the third computing device, and the second unique identifier; and
distributing the another new record over the network for local verification and updating of respective copies of the plurality of copies of the distributed database each locally stored in association with a respective second computing device.

13. The method of claim 1, further comprising determining whether a third computing device associated with a legacy designation indicative of lack of transmission of a validation request is designated as trusted by performing:
querying at least one copy of the plurality of copies of the distributed database to identify the latest record storing a third unique identifier indicative of the third computing device,
when the identified latest record storing the third unique identifier includes a designation of trusted, accessing a further unique identifier of the identified latest record indicative of a fourth computing device that validated the third computing device; and
designating the third computing device as untrusted when at least one of: the fourth computing device is designated as untrusted, and the fourth computing device is not authenticated.

14. The method of claim 1, further comprising:
determining that a third computing device designated as a legacy designation indicative of lack of transmission of a validation request designated as trusted-should be untrusted;
creating a second new record storing the untrusted designation of the third computing device, a third unique identifier indicative of the third computing device, and the second unique identifier;
traversing at least one copy of the distributed database to identify a fourth computing device that designated the third computing device designated as legacy as trusted;
when the fourth computing device is distinct from the certain second computing device, creating a third new record storing an untrusted designation of the fourth computing device, a fourth unique identifier indicative of the respective fourth computing device, and the second unique identifier; and
distributing the second new record and the third new record over the network for local verification and updating of respective copies of the plurality of copies of the distributed database.

15. The method of claim 1, wherein the validation request includes one or more members selected from the group consisting of: unique network identifier of the first computing device, description of the first computing device, unique public key of the first computing device, and information for assisting in validation of the first computing device by the second computing device.

16. A method of validating whether a first computing device for joining a common network session operating without a central authority is designated as trusted based on a plurality of copies of a distributed database each storing a trusted or untrusted designation for each of a plurality of network connected computing devices, the method performed by a second computing device designated as trusted and participating in the common network session without the central authority, the method comprising:

querying at least one copy of the plurality of copies of the distributed database to identify a latest record storing a first unique identifier indicative of the first computing device, when the identified latest record storing the first unique identifier includes a designation of trusted, accessing another unique identifier of the identified latest record indicative of a third computing device that validated the first computing device; and designating the first computing device as untrusted when at least one of: the third computing device is designated as untrusted, and the third computing device is not authenticated, wherein the first computing device designated as untrusted is prevented from joining itself to the common network session, wherein the first computing device is joined to the common network session by another computing device upon obtaining a trusted designation of the first computing device stored in the distributed database.

17. The method of claim 16, wherein the distributed database is arranged based on a block-chain architecture, wherein each record is stored in a block of the block-chain including a respective block header storing a hash-value calculated from one or more previous blocks in the chain, wherein the records are stored in blocks indicative of an order of events associated with the records, wherein each respective block includes a digital signature created with a private key of a third computing device that designated the computing device associated with the respective block, wherein a fourth computing device verifies that the third computing device designated the computing device associated with the respective block with a public key of the third computing device corresponding to the private key.

18. The method of claim 16, further comprising traversing records of the distributed database to iteratively identify each computing device that designated the computing device of the current record as trusted, and designating the first computing device as untrusted when at least one of the computing devices of the current record is designated as untrusted.

19. The method of claim 16, further comprising verifying that the first computing device owns a public key stored by the identified latest record and that the first computing device knows a private key corresponding to the public key, wherein the private key corresponding to the public key is automatically corrupted when the first computing device is compromised such that the first computing device is designated as untrusted in response to the corrupted private key that does not correspond to the public key.

20. A method of invalidating a first computing device designated as trusted based on a plurality of copies of a distributed database each storing a trust parameter indicative of a trusted or untrusted designation for each of a plurality of network connected computing devices, the method performed by a second computing device designated as trusted and participating in a common network session without a central authority, the method comprising:

determining that the computing device designated as trusted should be untrusted;

creating a first new record storing the untrusted designation of the first computing device, a first unique identifier indicative of the first computing device, and a second unique identifier indicative of the second computing device;

traversing at least one copy of the distributed database to identify at least one third computing device that designated the first computing device as trusted;

creating at least one second new record storing an untrusted designation for each respective third computing device, a third unique identifier indicative of the respective third computing device, and the second unique identifier; and distributing the first new record and the at least one second new record over the network for local verification and updating of respective copies of the plurality of copies of the distributed database, wherein the first computing device designated as untrusted is prevented from joining itself to the common network session, wherein the first computing device is joined to the common network session by another computing device upon obtaining a trusted designation of the first computing device stored in the distributed database.

\* \* \* \* \*